United States Patent [19]

Wolfe et al.

[11] Patent Number: 5,377,045
[45] Date of Patent: Dec. 27, 1994

[54] DURABLE LOW-EMISSIVITY SOLAR CONTROL THIN FILM COATING

[75] Inventors: Jesse D. Wolfe, San Ramon, Calif.; Abraham I. Belkind, North Planfield, N.J.; Ronald E. Laird, Benecia, Calif.

[73] Assignee: The BOC Group, Inc., Murray Hill, N.J.

[21] Appl. No.: 126,724

[22] Filed: Sep. 24, 1993

Related U.S. Application Data

[63] Continuation of Ser. No. 846,224, Mar. 4, 1992, abandoned, which is a continuation-in-part of Ser. No. 522,266, May 10, 1990, abandoned.

[51] Int. Cl.$^5$ ............................................. G02B 1/10
[52] U.S. Cl. .................................. 359/585; 359/360; 359/586; 359/588; 427/166; 427/167
[58] Field of Search ............... 359/360, 585, 586, 584, 359/588; 427/166, 167

[56] References Cited

U.S. PATENT DOCUMENTS

| | | |
|---|---|---|
| 3,682,528 | 8/1972 | Apfel et al. |
| 3,758,185 | 9/1973 | Gelber |
| 3,978,272 | 8/1976 | Donley |
| 4,022,947 | 5/1977 | Grubb et al. |
| 4,327,967 | 5/1982 | Groth |
| 4,450,201 | 5/1984 | Brill et al. |
| 4,462,883 | 7/1984 | Hart |
| 4,548,691 | 10/1985 | Dietrich et al. ................ 359/360 |
| 4,769,291 | 9/1988 | Belkind et al. |
| 4,773,717 | 9/1988 | Pai et al. |
| 4,780,372 | 10/1988 | Tracy et al. |
| 4,799,745 | 1/1989 | Meyer et al. ................ 359/360 |
| 4,828,346 | 5/1989 | Jacobson et al. ............ 359/360 |
| 4,902,081 | 2/1990 | Huffer ............................ 359/360 |
| 4,965,121 | 10/1990 | Young et al. |
| 5,047,131 | 9/1991 | Wolfe et al. |
| 5,069,968 | 12/1991 | Nietering ..................... 359/360 |

FOREIGN PATENT DOCUMENTS

| | | |
|---|---|---|
| 0303109 | 2/1989 | European Pat. Off. |
| 0456487 | 11/1991 | European Pat. Off. |
| 2345760 | 7/1975 | Germany |
| 63-100043 | 5/1988 | Japan |
| 63-242948 | 10/1988 | Japan |
| 2052787 | 5/1980 | United Kingdom |
| 2135697 | 9/1984 | United Kingdom |

OTHER PUBLICATIONS

Hoffman et al., "Internal Stresses in Cr, Mo, Ta, and Pt Films Deposited By Sputtering From a Planar Magnetron Source," *J. Vac. Sci. Technol.*, 20(3), (Mar. 1982), 355-358.

Shih et al., "Properties of Cr-N Films Produced by Reactive Sputtering," *J. Vac. Sci. Technol.*, A4(3), (May/Jun. 1986), 564-567.

Hoffman et al., "Compressive Stress and Inert Gas in Mo Films Sputtered From A Cylindrical-Post Magne- (List continued on next page.)

*Primary Examiner*—Scott J. Sugarman
*Assistant Examiner*—Michael A. Papalas
*Attorney, Agent, or Firm*—David A. Draegert; Larry R. Cassett

[57] ABSTRACT

An infrared reflecting interference filter capable of transmitting a desired proportion of visible radiation while reflecting a large portion of incident solar radiation is provided. The filter consists of a transparent substrate coated first with a dielectric layer, next a partially metal reflectance layer, and finally an outer protective dielectric layer. In addition, between each metal-dielectric interface is deposited a nucleation or glue layer that facilitates adhesions and improves chemical and mechanical resistance. The interference filters are durable and can be modified to provide a full range of optical and electrical characteristics. The dielectric layer can comprise of composite films consisting of silicon nitride in combination with zirconium nitride, titanium nitride, and/or hafnium nitride.

25 Claims, 3 Drawing Sheets

OTHER PUBLICATIONS tron with Ne, Ar, Kr, and Xe," *J. Vac. Sci. Technol.,* 17(1), (Jan./Feb. 1980) 380–383.

Belkind et al., "Reactive Co-Sputtering of Oxides and Nitrides Using a C-Mag TM Rotatable Cylindrical Cathode," *Surface and Coatings Technology,* 49, (1991) 155–160.

Bland et al., "Effect of Ion Bombardment During Deposition on Thick Metal and Ceramic Deposits," *J. Vac. Sci. Technol.,* 11(4), (Jul./Aug. 1974), 671–674.

Cuthrell et al., "Residual Stress Anisotropy, Stress Control, and Resistivity in Post Cathode Magnetron Sputter Deposited Molybdenum Films," *J. Vac. Sci. Technol.,* A6(5) (Sep./Oct. 1988), 2914–2920.

Thornton et al., "Internal Stresses in Metallic Films Deposited By Cylindrical Magnetron Sputtering," *Thin Solid Films,* 64 (1979) 111–119.

Hoffman et al., "Effects of Substrate Orientation and Rotation on Internal Stresses in Sputtered Metal Films", *J. Vac. Sci. Technol.,* 16(2) (Mar./Apr. 1979), 134–137.

Finegan et al., "Stress and Stress Anisotropy in Iron Films," *Trans. 8th Nat. Vac. Symp.,* Perganom Press (1961) 935–942.

Blachman, "dc Bias-Sputtered Aluminum Films," *J. Vac. Sci. Technol.,* 10(1), (Jan./Feb. 1973), 299–302.

Thornton et al., "Internal Stresses in Amorphous Silicon Films Deposited By Cylindrical Magnetron Sputtering Using Ne, Ar, Kr, Xe, and Ar+$H_2$," *J. Vac. Sci. Technol.,* 18(2), (Mar. 1981), 203–207.

Patent Abstracts of Japan, vol. 13, No. 049 (C-565) 3 Feb. 1989.

Patent Abstracts of Japan, vol. 12, No. 388 (C-527) 12 Sep. 1988.

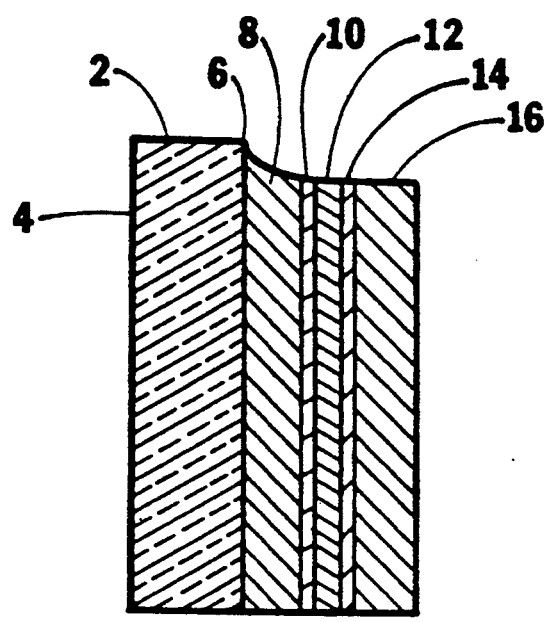
FIG._1A.
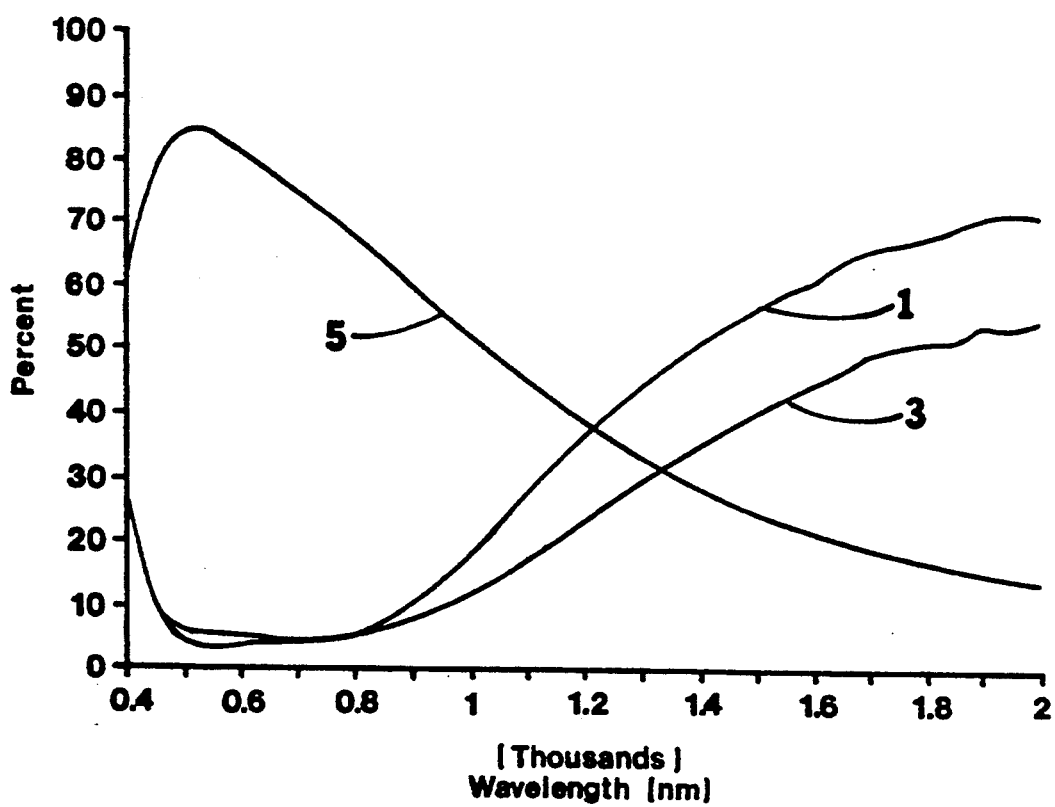
FIG._1B.

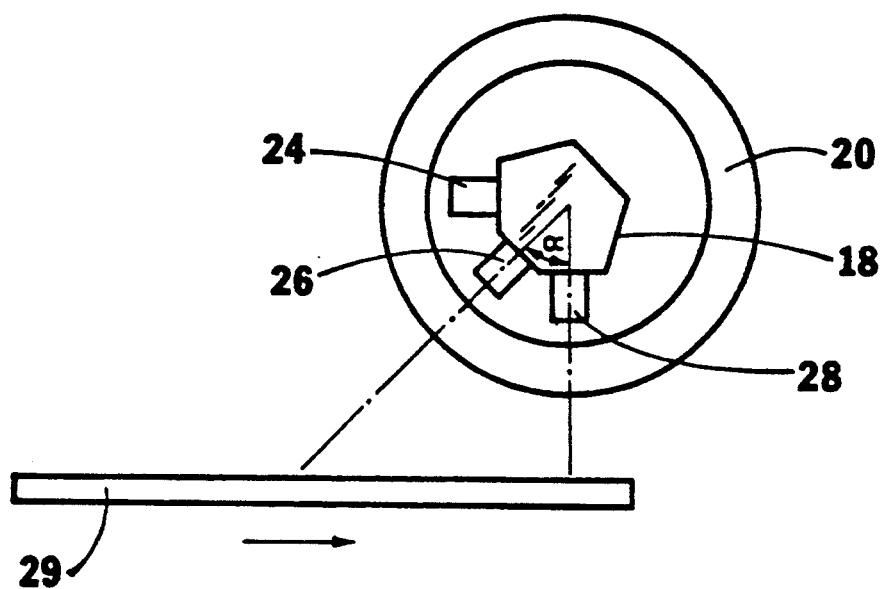
FIG._2.
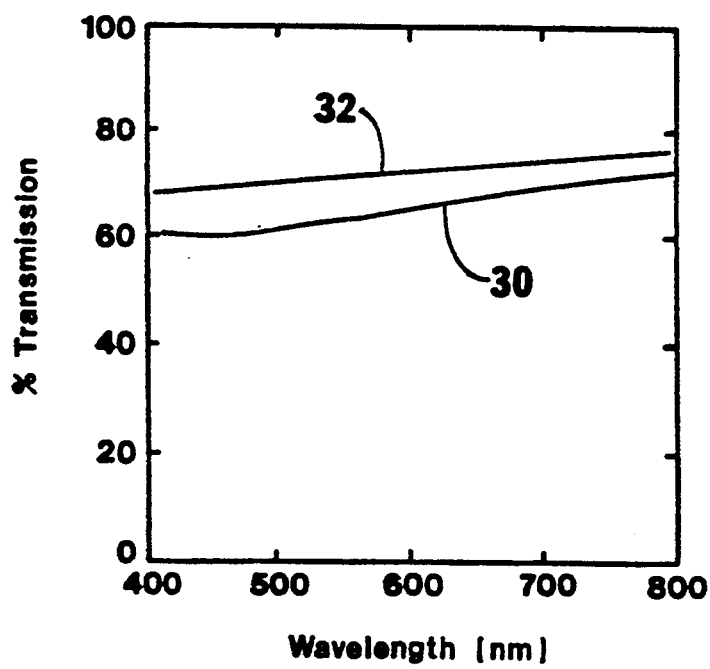
FIG._3.

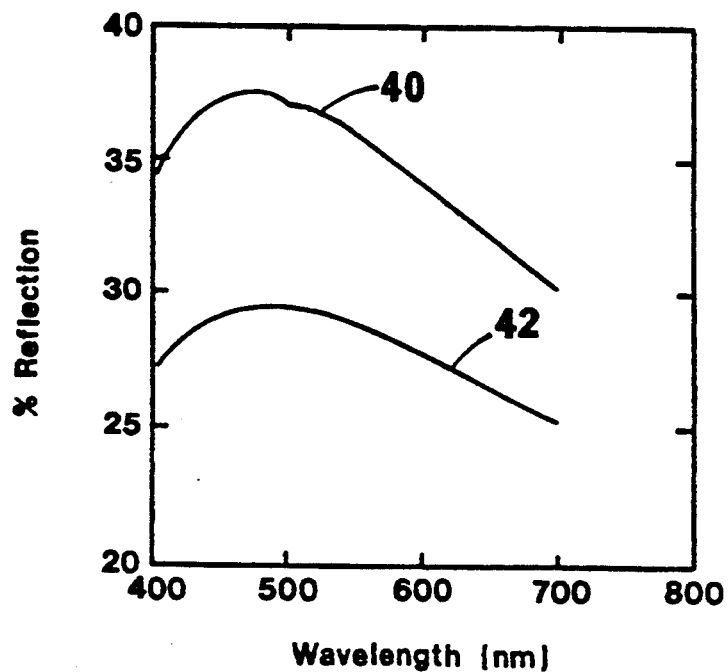
FIG._4.
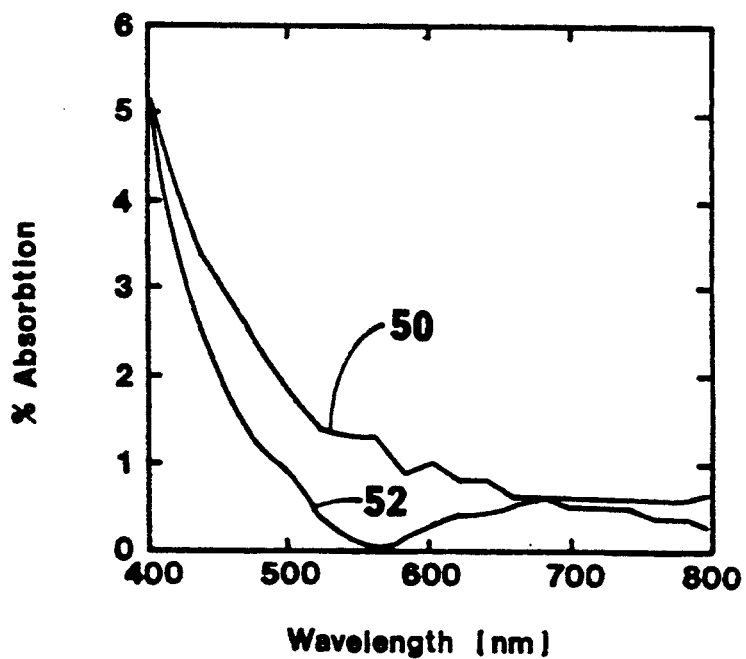
FIG._5.

DURABLE LOW-EMISSIVITY SOLAR CONTROL THIN FILM COATING

This is a continuation of application Ser. No. 07/846,224, filed Mar. 4, 1992, abandoned, which is a continuation-in-part of Ser. No. 522,266, filed May 10, 1990, now abandoned and has a common assignee.

BACKGROUND OF THE INVENTION

This invention relates generally to visibly transparent infrared reflecting interference filters, and more particularly, to a durable low-emissivity filter.

The use of transparent panels in buildings, vehicles and other structures for controlling solar radiation is quite prevalent today. The goal of solar control is to transmit light while excluding much of the solar energy, thus decreasing the amount of air condition or cooling required, and conserving energy. In addition, modified glass as a structural material provides the color flexibility architects desire.

Various processes have been employed to alter the optical properties of these panels, including coating glass or plastic substrates by various techniques such as electrolysis, chemical vapor deposition and physical vapor deposition, including sputtering with planar magnetrons. For instance, thin metal films have been deposited on glass or plastic to increase the reflectance of solar radiation. Windows deposited with a multi-layer dielectric-metal-dielectric coating that exhibits high visible transmittance, and high reflectivity and low emissivity in the infrared range, are even more energy efficient. The index of refraction of the dielectric layer is preferably 2.0 or greater in order to minimize the visible reflectance and enhance the visible transmittance of the window. This dielectric layer which often consists of metal oxide coating also offers additional protection to the fragile metal films. The optical properties of panels can also be modified by altering the composition of the substrate material. Nevertheless, interference filter panels manufactured by the above-described methods have been only partially successful in reflecting solar radiation to the degree required for significant energy conservation. For example, Apfel et al., U.S. Pat. No. 3,682,528, issued Aug. 8, 1972, described an infra-red interference filter with visible light transmission of only approximately 72% and with infra-red transmission of approximately 8%.

SUMMARY OF THE INVENTION

It is a primary object of the present invention to provide a durable, thin-film interference filter which transmits visible light while reflecting infrared radiation.

It is another object of the present invention to provide an interference filter that is useful in architectural panels which gives less reflected color of visible light over a wide band.

These and additional objects are accomplished by the present invention which provides a durable, thin-film interference filter which comprises a substrate onto which is deposited a dielectric layer, followed by metal and dielectric layers. In between each of the dielectric and metal layers is deposited a "nucleation" or glue layer that promotes adhesion between the dielectric to the metal. In one preferred embodiment of the invention, the interference filter comprises a glass substrate onto which is deposited a thin-film design consisting of five layers, namely: titanium oxide, nickel-chromium alloy, silver, nickel-chromium alloy, and silicon nitride.

Another preferred embodiment of the interference filter comprises of a five layer structure wherein one or both of the dielectric layers is formed of a composite material containing zirconium nitride and silicon nitride. It was found that mixing zirconium nitride with silicon nitride creates a composite layer that has a high refractive index and excellent transparency in the visible region. Moreover, the optical properties of this composite layer can be adjusted by varying the relative amounts of zirconium nitride and silicon nitride.

The dielectric layers of the inventive interferences filters can be reactively sputtered by a rotatable cylindrical magnetron. Composite layers can be formed by cosputtering from dual cathode targets or from one or more alloy targets. A feature of the inventive process is that by reducing the intrinsic stress of the second dielectric layer, an extremely hard and chemically resistant thin film coating is produced. In sputtering silicon nitride as the second dielectric layer, it was demonstrated that the intrinsic stress of this layer can be reduced by orienting the magnetic assembly of the cathode at an acute angle vis-à-vis the substrate.

Additional objects, advantages and features of the present invention will become apparent from the following detailed exemplary description, which description should be taken in conjunction with the accompanying drawings.

BRIEF DESCRIPTION OF THE DRAWINGS

FIG. 1a is a cross-sectional view of a five layer design thin-film interference filter produced in accordance with this invention.

FIG. 1b is a graph illustrating the spectral transmittance and reflectance of a thin-film interference filter.

FIG. 2 is a cross-sectional view of a cathode assembly.

FIG. 3 is a graph illustrating the spectral transmission in the visible light region for a composite film.

FIG. 4 is a graph illustrating the spectral reflection in the visible light region for a composite film.

FIG. 5 is a graph illustrating the spectral absorption in the visible light region for a composite film.

DESCRIPTION OF THE PREFERRED EMBODIMENTS

A thin-film interference filter incorporating the present invention is shown in FIG. 1a. As shown therein, the filter consists of a transparent substrate 2 which is provided with two planar parallel surfaces 4 and 6, in which surface 4 is exposed to the medium and surface 6 is coated. The substrate can be formed of any suitable transparent material; however, the substrate is preferably a material which has superior structural properties and minimum absorption in the visible and near-infrared spectra regions where the solar energy is concentrated. Crystalline quartz, fused silica, soda-lime silicate glass, and plastics such as polycarbonates and acrylates, are all preferred substrate materials.

Deposited onto the substrate surface 6 is a first dielectric layer 8 that is preferably made of a material having an index of refraction of greater than about 2.0, and most preferably between 2.4 and 2.7. Suitable dielectric layer materials include metal oxides such as titanium oxide, tin oxide, zinc oxide, indium oxide (optionally doped with tin oxide), bismuth oxide, and zirconium oxide. See Hart, U.S. Pat. No. 4,462,883, issued Jul. 31, 1984, which is incorporated herein by reference. Yet another suitable material is silicon nitride. A particularly suitable dielectric material comprises a thin composite film containing zirconium nitride and silicon nitride (collectively referred to herein as "SiZrN") that is fabricated by cosputtering from dual targets or from a single alloy target of a dc cylindrical magnetron, as described herein.

Zirconium nitride is an electrically conductive material which has very good optical reflectance in the infrared spectrum; however, this material is very absorbing in the visible portion of the spectrum and cannot be used on devices requiring high transparency. Silicon nitride, on the other hand, is very transparent in the near UV through the near IR spectrum (350 nm, 2.0 microns). It was discovered that mixing zirconium nitride with the silicon nitride creates a composite film that has a high index of refraction ($\geq 2.10$) and excellent transparency in the visible spectrum. The film also demonstrates good chemical and mechanical durability. Furthermore, by employing cosputtering with dual cathode targets, the index of refraction of the film can be adjusted by varying the amount of power to each cathode and/or the gases used in the process. The index of refraction of the film so fabricated ranges from approximately 2.00 to 2.45.

Besides SiZrN, composite films comprising titanium nitride and silicon nitride (collectively referred to herein as "SiTiN") or comprising hafnium nitride and silicon nitride (collectively referred to herein as "SiHfN") can also be used. SiTiN and SiHfN composite films are also prepared by cosputtering from dual or single targets. Finally, a composite film comprising a mixture of silicon nitride, zirconium nitride, titanium nitride, and/or hafnium nitride can be used as the first dielectric layer. As will be described further below, the refractive index of the composite films will vary depending on the relative amounts of the different nitrides that comprise each film.

It has been found that when silicon nitride is used as the first dielectric layer, the visible light transmission of the inventive filter is slightly less than the transmission when titanium oxide or a composite film is used.

The thickness of the first dielectric layer ranges from approximately 200 to 500 Å, and more preferably from approximately 300 to 350 Å.

As shown in FIG. 1a, the inventive filter next comprises of a first metal precoat 10 that is deposited over the first dielectric layer. Precoat layer 10 is preferably maintained as thin as possible so that it will have very little, if any, adverse effect upon the optical characteristics of the filter or the subsequent metal layer. Precoat layers with thicknesses ranging from approximately 5 to 20 Å have been satisfactory; more preferably, the thickness is between approximately 8 to 16 Å. This thin precoat layer can be formed from any number of metals. It has been found that nickel-chromium alloy comprising approximately 1 to 80 percent nickel and approximately 1 to 20 percent chromium can be used as a precoat; more preferably, the alloy content is approximately 80 percent nickel and 20 percent chromium. The precoat layer may comprise approximately 80 to 95 weight % nickel and 5 to 20% chromium. Other metals and alloys thereof that can be used as a precoat include nickel, chromium, rhodium, platinum, tungsten, molybdenum, and tantalum. See Hart, U.S. Pat. No. 4,462,883, issued Jul. 31, 1984. The precoat layer apparently acts as a glue or nucleation layer and as a stress reducing layer. It is believed that while the precoat layer is thin enough not to adversely affect the optical properties of the filter, it causes the metal film 12 to behave as if it were a homogeneous metal slab.

Next, a partially reflective metal layer 12 is deposited onto the first precoat layer. The metal layer reflects infrared-radiation, yet allows for sufficient visible light transmission. The metal layer can be formed from a number of materials, with silver being particularly satisfactory. Other metals which also can be utilized include gold, copper and platinum. The thickness of the metal layer ranges from approximately 40 to 150 Å, and more preferably, from approximately 90 to 110 Å.

In this preferred embodiment, a second metal precoat layer 14 is then deposited onto the metal layer which is followed by the final dielectric layer 16. This second metal precoat layer can be formed from the same material and in the same thickness range as precoat layer 10. The second dielectric layer can be made of silicon nitride that is formed by reactive sputtering a cylindrical magnetron. This layer has a thickness from approximately 350 to 500 Å, and more preferably from approximately 450 to 475 Å. The above referenced composite films can also be used although the relative proportion of silicon nitride in each film is adjusted so that the refractive index ranges preferably from approximately 2.04 to 2.10. When a composite film is used, its thickness should be from approximately 300 to 500 Å, preferably 350 to 375 Å. However, whether silicon nitride or a composite substance is used as the second dielectric layer, the layer most preferably exhibits low intrinsic stress as described further below. A suitable composite film is SiZrN comprising approximately 80–83% by weight silicon nitride and the balance zirconium nitride. This particular film has a refractive index of approximately 1.85 to 2.2. A preferred SiZrN composite film has a refractive index of about 2.08. As will be described below, the inventive filters offer excellent mechanical and corrosion resistance.

The precoat and metal layers were deposited with a D.C. planar magnetron. Other techniques including E-beam evaporation could have also been employed. The dielectric layers of the inventive filter were prepared by DC-reactive sputtering with a rotating cylindrical magnetron. The magnetron reactive sputtering technique is particularly useful for depositing dielectric films. While there are other techniques for depositing the dielectric layers such as thermal oxidation and LPCVD (low pressure chemical vapor deposition), these methods suffer from, among other things, slow deposition rates. Moreover, RF planar magnetron sputtering for depositing dielectric material is impractical for large-scale industrial applications because of the enormous power requirements and RF radiation hazards. A description of a cylindrical magnetron suitable for depositing substrates with the dielectric materials is found in Wolfe et al., U.S. Pat. No 5,047,131, issued Sep. 10, 1991, incorporated herein by reference. To provide additional protection to the inventive filter, a plastic laminate can be applied to the filter of FIG. 1a. See Young et al., U.S. Pat. No. 4,965,121, issued Oct. 23, 1990 incorporated herein by reference.

In fabricating the inventive filter, it was found that by reducing the intrinsic stress of the second dielectric layer 16, an extremely hard and chemically resistant thin film coating is produced. Stress is an important variable that is inherent in each layer of a thin film stack. There are generally two stress states: (1) compressive, where the film is trying to expand on the substrate and, (2) tensile, where the film is trying to contract. In magnetron systems, the pressure of the vacuum depositing chamber is an important factor which influences stress. It is believed that at sufficiently low pressures, sputtered atoms and reflected neutral gas atoms impinge on the film at nearly normal incidence with high energy because at lower pressures there are fewer collisions within the plasma (larger mean free path). This mechanism, as reported by Hoffman and Thorton in *Thin Solid Films*, 40, 355 (1977), is known as "atomic peening", and is believed to cause compression in films.

At higher working pressures, the sputtered atoms collide with atoms in the plasma more frequently. Sputtered material reaches the substrate at oblique incidence and with lower energies. The decrease in kinetic energy of the incident atoms makes the peening mechanism inoperative. The decrease in the flux of atoms arriving at normal incidence results in "shadowing" —voids remaining from the nucleation stage of film growth are not filled because nucleation sites shadow the obliquely arriving atoms. Shadowing and "competing cone growth" can lead to isolated columnar grain structures and an extensive void network. Messier and Yehoda, *J. Appl. Phys.*, 58, 3739 (1985).

Whatever the cause of internal stress in sputtered films, there is, for a given set of system parameters (e.g., magnetron geometry, deposition rate, film thickness, gas pressure), an abrupt transition from compression to tension at a critical pressure which depends on the atomic mass of the material. (Hoffman and Thorton, *Thin Solid Films*, 45, 387 (1977); Hoffman and Thorton, *J. Vac. Sci. Technol.*, 20, 355 (1982); Hoffman and Thorton, *J. Vac. Sci. Technol.*, 17, 380 (1980).) Above this critical pressure, tensile stresses gradually decrease to zero. The relaxation of stress beyond some maximum tensile stress point was reported for chromium sputtered in argon and molybdenum sputtered in xenon. Shih et al., "Properties of Cr-N Films Produced by Reactive Sputtering", *J. Vac. Sci. Technol.* A4 (3), May/June 1986, 564–567.

In depositing silicon nitride as the second dielectric layer with a rotatable cylindrical magnetron, it was found that the intrinsic stress of the silicon nitride layer can be reduced by orienting the magnetic assembly of the cathode at an acute angle. As shown in FIG. 2, which is a cross-sectional view of cathode 20 and substrate 29, the magnetic assembly 18 has a "W" configuration with three elongated magnetics 24, 26, and 28. The permanent magnetics used formed an unbalanced system which is typical for rotatable cylindrical magnetrons. As is apparent, the assembly is oriented at an acute angle $\alpha$ of approximately 45° so as to direct sputtered material towards the substrate 29 as it enters the deposition chamber. Angle $\alpha$ can range from approximately 30° to 80°. Silicon nitride layers so deposited have approximately one-fourth the intrinsic stress of silicon nitride layers produced when the assembly is at a normal angle relative to the substrate.

Experimental Results

A low-emissivity interference filter having the structure as shown in FIG. 1a comprising a glass substrate, a titanium oxide first dielectric layer, nickel-chromium alloy precoat layers, a silver metal layer, and a silicon nitride second dielectric layer was fabricated in an in-line magnetron system manufactured by Airco Coating Technology, a division of Assignee. It is known that $TiO_2$ is the predominant form of titanium oxide created in the sputtering process. However, it is believed that other forms are produced as well. Thus, unless otherwise stated, $TiO_2$ will represent all forms of titanium oxide produced. The system comprises of five magnetrons arranged in series, with each magnetron depositing one of the five layers of the filter. The second, third, and fourth are planar magnetrons for depositing the first precoat, metal, and second precoat layers respectively. The planar magnetrons, each comprising of a model HRC-3000 unit, were manufactured by Airco Coating Technology. The first and fifth magnetrons are cylindrical magnetrons to deposit the dielectric layers. The cylindrical magnetrons, each comprised of a C-Mag ® model 3000 cathode, also manufactured by Airco Coating Technology.

The target(s) for each of the cylindrical magnetrons was conditioned using an inert gas, thereafter the process gas was added until the desired partial pressure was reached. The process was operated at that point until the process was stabilized. The substrate was then introduced to the coat zone of the first cylindrical magnetron and the film was applied. The substrate used was soda lime glass.

For depositing a first dielectric layer comprising of titanium oxide, a C-MAG ® rotatable magnetron employing a titanium target was used. Alternatively, a planar magnetron can be employed. Argon was the inert gas and oxygen was the reactant gas. When depositing silicon nitride in the cylindrical magnetron, argon was used as an inert gas and nitrogen was used as the reactant gas. The partial pressure of the gas was determined by the transition from the nitride mode to the metallic mode. Experiments were run as close to that transition as practicable. The pressure and flow rate of the sputtering gases were controlled by conventional devices.

Because the electrical conductivity of pure silicon is so low that it is unsuitable for sputtering with direct current, the silicon target was impregnated or doped with a small amount of aluminum in the range of from 2–4%. The target was prepared by plasma spray. The sputtering source was connected to an appropriate direct current power source having provision for automatically maintaining the voltage, current or power, as desired. The magnet assembly of the single cathode was oriented at an angle of approximately 45° from normal.

With nitrogen as the sputtering gas, the coating contained a mixture of aluminum and silicon nitrides. All of these components are relatively hard and form an amorphous film that acts as a strong barrier. However, the amount of aluminum in the film did not interfere with formation of the desired silicon based compound films. In the course of the experiments, films were sent out for independent RBS (Rutherford Back-Scattering) sampling to determine the composition of the compound. The silicon nitride measured 42% Si/57% N, which is very close to the theoretical 3:4 ratio for nitride ($Si_3N_4$).

Table 1 sets forth the process data for deposition of an inventive filter.

TABLE 1

| Layer | Thickness (Å) | Flowrate (SCCM) Ar | Flowrate (SCCM) $N_2$ | Flowrate (SCCM) $O_2$ | Potential (V) | Power (kW) | Pressure ($\mu$) | No. Passes | Substrate Speed (in/min) |
| --- | --- | --- | --- | --- | --- | --- | --- | --- | --- |
| $TiO_2$ | 327 | 71 | 0 | 131 | −371 | 40 | 1.5 | 8 | 47 |
| NiCr | 12 | 170 | 0 | 0 | −444 | 1 | 3.0 | 1 | 154 |
| Ag | 100 | 69 | 0 | 0 | −552 | 10 | 1.5 | 1 | 154 |
| NiCr | 12 | 170 | 0 | 0 | −444 | 1 | 3.0 | 1 | 154 |
| $Si_3N_4$ | 461 | 12 | 60 | 0 | −387 | 15(×2) | 5.0 | 2 | 31 |

The above filter had the following optical and electrical characteristics:

| | |
| --- | --- |
| 82.4 | % Transmittance (integrated D65 source) |
| 6.1 | % Reflectance of the film covered side |
| 11.5 | % Absorbance |
| 10.5 $\Omega/\square$ | Electrical sheet resistance |
| 0.09 | Emissivity |

The durability of the inventive filter of Table 1 was tested. The procedures of the chemical and mechanical tests that were performed are described in Table 2. The inventive filter passed all the tests.

Curve 1 in FIG. 1*b* illustrates the reflectance of the interferance filter produced under the parameters set forth in Table 1 as from the film side. Curve 3 is the reflectance of the uncoated substrate side and curve 5 is the transmittance. The measurements were performed with a scanning spectrophotometer.

TABLE 2

| Test Conditions and Scoring Procedures | |
| --- | --- |
| 1. Humidity Test | Exposures in a humidity cabinet for: (1) 24 hrs. at 90° C. and 98% RH and (2) 96 hrs. at 60° C. and 98% RH. |
| 2. Salt Fog Test | 20% Salt Fog, 95–98° F. for 72 hrs. |
| 3. UV Exposure Test | Exposure for 24 hrs. with cycles of 4 hrs. condensation until failure or 120 hrs. |
| 4. Ammonium Test | Samples are placed upright in closed container of 50% ammonium hydroxide solution at room temperature for 5 hrs. |
| 5. Salt Dot Test | A 1% salt solution is applied to a filter paper dot placed on the film with the sample placed in a constant humidity environment for 24 hrs. |

Evaluations of the above tests are based on both microscopic evaluation and emissivity measurements. The details of the evaluations are:

A. Samples are scored for evidence of microscopic corrosion as seen under 200 × magnification on a scale of 1 to 10, where 10 is unaffected and 1 is completely corroded.

B. Measure the change in emissivity due to corrosion. The scoring is based on:
Emissivity Score = 10 (Emiss. before/Emiss. after)

C. Recorded scores are an average of 1 and 2

| | |
| --- | --- |
| 6. Taber Abrasion | Samples are subjected to a total of 50 revolutions on the Taber abrader, using the standard 500 gram weight and CS-10F wheels. |

Evaluation is based on the average number of scratches seen under 50× magnification in 4 inch$^2$ areas. Using the equation below gives a score of 0 for more than 55 scratches in a 1″ square area and 10 for none:

Taber Score = 10 − [(#scratches) × (0.18)]

As stated above, in other embodiments of the inventive filter, one or both of the dielectric layers can comprise of composite films of either SiZrN, SiTiN, SiHfN, or mixtures thereof. For each composite, the relative amount of silicon nitride ranges from approximately 60–95% by weight depending on whether the composite is used as the first or second dielectric layer. The index of refraction of the composite film correspondingly ranges from approximately 2.4 (60% silicon nitride) to approximately 2.05 (95% silicon nitride).

One method of depositing composite films is cosputtering of a cylindrical magnetron employing dual targets with one target being made of silicon and the other target being made of either zirconium, titanium, hafnium, or mixtures thereof. When cosputtering with dual cathodes with nitrogen as the reactant gas, the angle of the magnetic assembly of each target can be adjusted to get homogeneous composition distribution. See Belkind et al., U.S. patent application Ser. No. 671,360, filed Mar. 19, 1991, of common assignee, and Belkind et al., "Reactive Co-Sputtering of Oxides and Nitrides using a C-MAG ® Rotatable Cylindrical Cathode," *Surface and Coating Technology*, 49 (1991), 155–160.

Another method of depositing composite films is to have one or more alloy targets, each coated with silicon and either zirconium, titanium, hafnium, or a mixture thereof. A process for fabricating cylindrical alloy targets involves doping silicon and another metal (or other metals) to form a conductive silicide. For instance, doping silicon and zirconium results in forming $ZrSi_2$, a conductive silicide that possesses a bulk resistivity of approximately 160 micro ohm cm. This material is conductive enough to be sputtered by a magnetron. The silicide can be synthesized by heating zirconium and silicon together (hot press technique) to a sufficient temperature to form $ZnSi_2$. Thereafter, the silicide is grounded to a powder and sprayed onto a stainless steel backing tube to form a homogeneous coating.

ZnSiN composite films were formed by cosputtering a C-MAG rotatable magnetron system manufactured by Airco Coating Technology. The system employed dual cathode targets wherein the angle the magnetic assembly of each target was set at approximately 45° relative to normal so as to focus the ZrN and $Si_3N_4$ molecules onto the glass substrates. It is believed that ZrN is the predominant form of zirconium nitride created in the sputtering process, although other forms may be produced as well. Thus, unless otherwise stated, ZrN will represent all forms of zirconium nitride sputtered.

With dual targets, the relative amounts of reactively sputtered material deposited from each target can be regulated, in part, by adjusting the power to each target. Employing this technique, three different ZrSiN composite films were deposited. The first film comprised of approximately 60% $Si_3N_4$ and 40% ZrN (60/40), the second comprised of approximately 72% $Si_3N_4$ and 28% ZrN, and the third comprised of approximately 83% $Si_3N_4$ and 17% ZrN (83/17).

Curves 30 and 32 in FIG. 3 illustrate the percentage transmission in the visible light region for films one (60/40) and three (83/17), respectively; curves 40 and 42 in FIG. 4 illustrate the percentage reflection in the visible light region for films one (60/40) and three (83/17), respectively; and curves 50 and 52 in FIG. 5 illustrate the percentage absorption for films one (60/40) and three (83/17), respectively.

Table 3 sets forth the refractive index (n) and extinction coefficient (k) values versus wavelength (λ) for the first composite film (60% $Si_3N_4$, 40% ZrN), and Table 4 sets forth the optical values versus wavelength for the second composite film (72% $Si_3N_4$, 28% ZrN). (The optical values were measured by an ellipsometer.)

TABLE 3

| λ | n | k |
|---|---|---|
| 380 | 2.600 | 0.0500 |
| 400 | 2.566 | 0.0500 |
| 420 | 2.557 | 0.0400 |
| 440 | 2.542 | 0.0350 |
| 460 | 2.521 | 0.0300 |
| 480 | 2.500 | 0.0250 |
| 500 | 2.472 | 0.0200 |
| 520 | 2.463 | 0.0150 |
| 540 | 2.449 | 0.0150 |
| 560 | 2.436 | 0.0150 |
| 580 | 2.424 | 0.0100 |
| 600 | 2.412 | 0.0110 |
| 620 | 2.404 | 0.0090 |
| 640 | 2.396 | 0.0080 |
| 660 | 2.389 | 0.0070 |
| 680 | 2.382 | 0.0060 |
| 700 | 2.376 | 0.0060 |
| 720 | 2.371 | 0.0060 |
| 740 | 2.366 | 0.0060 |
| 760 | 2.361 | 0.0050 |
| 780 | 2.356 | 0.0040 |
| 800 | 2.353 | 0.0030 |
| 820 | 2.349 | 0.0030 |
| 840 | 2.347 | 0.0001 |
| 860 | 2.344 | 0.0000 |
| 880 | 2.341 | 0.0000 |
| 900 | 2.338 | 0.0000 |
| 920 | 2.337 | 0.0000 |
| 940 | 2.335 | 0.0000 |
| 960 | 2.332 | 0.0000 |
| 980 | 2.332 | 0.0000 |
| 1000 | 2.329 | 0.0000 |
| 2000 | 2.300 | 0.0000 |

TABLE 4

| λ | n | k |
|---|---|---|
| 300 | 2.4972 | 0.1768 |
| 350 | 2.3298 | 0.0718 |
| 400 | 2.2752 | 0.0400 |
| 450 | 2.2298 | 0.0156 |
| 500 | 2.2122 | 0.0071 |
| 550 | 2.1957 | 0.0001 |
| 600 | 2.1886 | 0.0028 |
| 650 | 2.1813 | 0.0051 |
| 700 | 2.1779 | 0.0060 |
| 800 | 2.1724 | 0.0070 |
| 1000 | 2.1673 | 0.0070 |
| 2000 | 2.1500 | 0.0070 |

As is apparent, refractive index in the visible region was higher for the first composite film which has less $Si_3N_4$.

Although the invention has been described with respect to its preferred embodiments, it will be understood that the invention is to be protected within the full scope of the appended claims.

It is claimed:

1. A thin film interference filter having a substantially neutral visible reflected color, comprising:
   a transparent substrate;
   a first substantially transparent dielectric layer having a refractive index within a range of approximately 2.0 and 2.7;
   a first metal precoat layer;
   a partially reflective metal layer;
   a second metal precoat layer; and
   a second substantially transparent dielectric layer comprising silicon nitride.

2. The thin film interference filter as defined in claim 1 wherein said first dielectric layer comprises of titanium oxide.

3. The thin film interference filter as defined in claim 2 wherein the first dielectric layer has a thickness ranging from approximately 200 to 500 Å and the second dielectric layer has a thickness ranging from approximately 350 to 500 Å.

4. The thin film interference filter as defined in claim 2 wherein said second dielectric layer comprises a composite of silicon nitride and zirconium nitride, and wherein the first dielectric layer has a thickness ranging from approximately 200 to 500 Å and the second dielectric layer has a thickness ranging from approximately 300 to 500 Å.

5. The thin film interference filter as defined in claim 2 wherein said second dielectric layer comprises a composite of silicon nitride and one or more other nitrides selected from the group consisting of zirconium nitride, titanium nitride, and hafnium nitride, and wherein said second dielectric layer comprises of approximately 60 to 95% by weight of silicon nitride, and wherein the first dielectric layer has a thickness ranging from approximately 200 to 500 Å and the second dielectric layer has a thickness ranging from approximately 350 to 500 Å.

6. The thin film interference filter as defined in claim 1 wherein said first dielectric layer comprises of silicon nitride.

7. The thin film interference filter as defined in claim 6 wherein the first dielectric layer has a thickness ranging from approximately 200 to 500 Å and the second dielectric layer has a thickness ranging from approximately 350 to 500 Å.

8. The thin film interference filter as defined in claim 6 wherein said second dielectric layer comprises a composite of silicon nitride and zirconium nitride, and wherein the first dielectric layer has a thickness ranging from approximately 200 to 500 Å and the second dielectric layer has a thickness ranging from approximately 300 to 500 Å.

9. The thin film interference filter as defined in claim 6 wherein said second dielectric layer comprises a composite of silicon nitride and one or more other nitrides selected from the group consisting of zirconium nitride, titanium nitride, and hafnium nitride, and wherein said second dielectric layer comprises of approximately 60 to 95% by weight of silicon nitride, and wherein the first dielectric layer has a thickness ranging from approximately 200 to 500 Å and the second dielectric layer has a thickness ranging from approximately 350 to 500 Å.

10. The thin film interference filter as defined in claim 1 wherein said first dielectric layer comprises a composite of silicon nitride and zirconium nitride.

11. The thin film interference filter as defined in claim 1 wherein said first dielectric layer comprises a composite of silicon nitride and one or more other nitrides selected from the group consisting of zirconium nitride, titanium nitride, and hafnium nitride, wherein said first dielectric layer comprises of approximately 60 to 95% by weight of silicon nitride.

12. The thin film interference filter as defined in claim 11 wherein the first dielectric layer has a thickness ranging from approximately 200 to 500 Å and the second dielectric layer has a thickness ranging from approximately 350 to 500 Å.

13. The thin film interference filter as defined in claim 11 wherein said second dielectric layer comprises a composite of silicon nitride and zirconium nitride, and wherein the first dielectric layer has a thickness ranging from approximately 200 to 500 Å and the second dielectric layer has a thickness ranging from approximately 350 to 500 Å.

14. The thin film interference filter as defined in claim 11 wherein said second dielectric layer comprises a composite of silicon nitride and one or more other nitrides selected from the group consisting of zirconium nitride, titanium nitride, and hafnium nitride, and wherein said second dielectric layer comprises of approximately 60 to 95% by weight of silicon nitride, and wherein the first dielectric layer has a thickness ranging from approximately 200 to 500 Å and the second dielectric layer has a thickness ranging from approximately 350 to 500 Å.

15. The thin film interference filter as defined in either claims 5, 9, or 14 wherein one or both metal precoat layers is formed from a metal selected from the group consisting of nickel, chromium, tungsten, and platinum and alloys thereof and wherein said partially reflective metal layer is formed from a metal selected from the group consisting of silver, gold, copper, and platinum.

16. The thin film interference filter as defined in claim 15 wherein one or both precoat layers is a metal film wherein the metal elements comprise approximately 80 to 95 weight % nickel and 5 to 20% chromium.

17. A method for the production of a durable thin film interference filter on a transparent substrate, with said filter having a substantially neutral visible reflected color, comprising the steps, in sequence, of:
reactively sputtering a first substantially transparent dielectric layer having a refractive index within a range of approximately 2.0 to 2.7 onto said substrate;
depositing a first metal precoat layer;
depositing a partially reflective metal layer;
depositing a second metal precoat layer; and
reactively sputtering a second substantially transparent protective dielectric layer comprising silicon nitride onto said second metal precoat layer, which comprises the steps of:
(a) providing a cylindrical magnetron having a silicon coated rotatable target and having magnetic means disposed at an angle of approximately 30° to 80° from normal relative to said substrate; and
(b) moving said substrate towards the rotatable target so that dielectric material reactively sputtered is focused onto the substrate at an acute angle as the substrate approaches the target in order to reduce the intrinsic stress of the second dielectric layer that is formed.

18. The method for the production of a durable thin film interference filter as defined in claim 17 wherein the step of reactively sputtering the second dielectric layer comprises of:
(a) providing a cylindrical magnetron that is coated with a target material comprising silicon and one or more metals selected from the group consisting of zirconium, titanium, and hafnium; and
(b) reactively sputtering in an atmosphere containing nitrogen so that the second dielectric layer comprises a composite of silicon nitride and one of the nitrides selected from the group consisting of zirconium nitride, titanium nitride, and hafnium nitride, and wherein said second dielectric layer comprises of approximately 60 to 95% by weight of silicon nitride.

19. The method for the production of a durable thin film interference filter as defined in either claim 17 or 18 wherein said magnetic means is disposed at an angle of approximately 45°.

20. The method for the production of a durable thin film interference filter as defined in claim 19 wherein the first dielectric layer comprises silicon nitride or titanium oxide.

21. A method for the production of a durable thin film interference filter on a transparent substrate, with said filter having a substantially neutral visible reflected color, comprising the steps, in sequence, of:
reactively sputtering a first substantially transparent dielectric layer having a refractive index within a range of approximately 2.0 to 2.7 onto said substrate, wherein said first dielectric layer comprises a composite of silicon nitride and one or more other nitrides selected from the group consisting of zirconium nitride, titanium nitride, and hafnium nitride, wherein said first dielectric layer comprises of approximately 60 to 95% by weight of silicon nitride onto said substrate;
depositing a first metal precoat layer;
depositing a partially reflective metal layer;
depositing a second metal precoat layer; and
reactively sputtering a second substantially transparent protective dielectric layer onto said second metal precoat layer.

22. The method for the production of a durable thin film interference filter as defined in claim 21 wherein the second dielectric layer comprises of silicon nitride.

23. The method for the production of a durable thin film interference filter as defined in claim 21 wherein the second dielectric layer comprises a composite of silicon nitride and one or more other nitrides selected from the group consisting of zirconium nitride, titanium nitride, and hafnium nitride, and wherein said second dielectric layer comprises of approximately 60 to 95% by weight of silicon nitride.

24. A method for the production of a durable thin film interference filter on a transparent substrate, with said filter having a substantially neutral visible reflected color, comprising the steps, in sequence, of:
reactively sputtering a first substantially transparent dielectric layer having a refractive index within a range of approximately 2.0 to 2.7 onto said substrate;
depositing a first metal precoat layer;
depositing a partially reflective metal layer;
depositing a second metal precoat layer; and
reactively sputtering a second substantially transparent protective dielectric layer onto said metal precoat layer wherein said second dielectric layer is a composite comprising of silicon nitride and one or more other nitrides selected from the group consisting of zirconium nitride, titanium nitride, and hafnium nitride, and wherein said second dielectric layer comprises of approximately 60 to 95% by weight of silicon nitride.

25. The method for the production of a durable thin film interference filter as defined in claim 24 wherein the first dielectric layer comprises silicon nitride or titanium oxide.

* * * * *